(12) United States Patent
Kowles et al.

(10) Patent No.: US 9,620,255 B2
(45) Date of Patent: Apr. 11, 2017

(54) NUCLEAR CONTROL ROD POSITION INDICATION SYSTEM

(75) Inventors: Joseph E. Kowles, South Glastonbury, CT (US); David A. Story, Bloomfield, CT (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1245 days.

(21) Appl. No.: 13/326,465

(22) Filed: Dec. 15, 2011

(65) Prior Publication Data

US 2012/0155596 A1    Jun. 21, 2012

Related U.S. Application Data

(60) Provisional application No. 61/424,745, filed on Dec. 20, 2010.

(51) Int. Cl.
| | | |
|---|---|---|
| *G21C 9/02* | (2006.01) | |
| *G21C 17/12* | (2006.01) | |
| *G01D 5/251* | (2006.01) | |
| *G21C 7/12* | (2006.01) | |

(52) U.S. Cl.
CPC ........... *G21C 17/12* (2013.01); *G01D 5/2515* (2013.01); *G21C 7/12* (2013.01); *G21C 9/02* (2013.01); *Y02E 30/32* (2013.01); *Y02E 30/39* (2013.01)

(58) Field of Classification Search
None
See application file for complete search history.

(56) References Cited

U.S. PATENT DOCUMENTS

| | | | |
|---|---|---|---|
| 3,656,074 A | | 4/1972 | Bevilacqua et al. |
| 4,014,741 A | * | 3/1977 | Foxworthy et al. .......... 376/258 |
| 4,056,979 A | * | 11/1977 | Bongort et al. ................ 73/313 |
| 4,068,163 A | | 1/1978 | Foxworthy |
| 4,626,404 A | | 12/1986 | Chubb |
| 4,631,537 A | | 12/1986 | Neuner et al. |
| 4,714,926 A | | 12/1987 | Neuner et al. |
| 4,730,491 A | * | 3/1988 | Lew ............................... 73/308 |
| 5,333,160 A | * | 7/1994 | Runde .......................... 376/258 |
| 5,684,847 A | | 11/1997 | DeFoort et al. |
| 6,380,734 B1 | | 4/2002 | Chari et al. |
| 8,442,180 B2 | | 5/2013 | Nakamura et al. |

(Continued)

FOREIGN PATENT DOCUMENTS

| | | |
|---|---|---|
| JP | S58184587 A | 10/1983 |
| TW | 200643981 | 4/1995 |
| WO | 2010/144563 A1 | 12/2010 |

OTHER PUBLICATIONS

Ingersoll, D.T., Deliberately Small Reactors and the Second Nuclear Era, Progress in Nuclear Energy, vol. 51, p. 589-603 (2009).*

(Continued)

*Primary Examiner* — Sean P Burke
(74) *Attorney, Agent, or Firm* — Richard J. Coldren; Westinghouse Electric Company LLC

(57) ABSTRACT

A high temperature reed switch position indicator for a pressurized water reactor in which the drive rod housing is completely immersed in the reactor coolant. The reed switch sensor modules positioned along the control rod drive rod travel housing are constructed solely of metallic, ceramic and glass materials and are sealed within an outer housing to isolate the sensor assembly from the coolant.

14 Claims, 6 Drawing Sheets

(56) References Cited

U.S. PATENT DOCUMENTS

| | | | |
|---|---|---|---|
| 2003/0133267 A1* | 7/2003 | Beihoff et al. | 361/704 |
| 2007/0086556 A1* | 4/2007 | Nakamura et al. | 376/258 |
| 2010/0316177 A1* | 12/2010 | Stambaugh et al. | 376/229 |
| 2011/0228640 A1* | 9/2011 | Holcomb et al. | 367/99 |

OTHER PUBLICATIONS

International Search Report for PCT/US2011/065729 dated Apr. 23, 2012 (Form PCT/ISA/210).
Written Opinion of the International Searching Authority for PCT/US2011/065729 dated Apr. 23, 2012 (Form PCT/ISA/237).
International Preliminary Report on Patentability for PCT/US2011/065729 dated Jun. 25, 2013 (Forms PCT/IB/373, PCT/ISA/237).

\* cited by examiner

NUCLEAR CONTROL ROD POSITION INDICATION SYSTEM

CROSS REFERENCE TO RELATED APPLICATION

This application claims priority under 35 U.S.C. §119(e) to U.S. Provisional Patent Application Ser. No. 61/424,745, filed Dec. 20, 2010, entitled, HIGH TEMPERATURE REED SWITCH POSITION INDICATOR.

BACKGROUND

1. Field

This invention relates in general to nuclear reactor control systems, and, in particular to a position indication system for identifying the movement and position of nuclear control rods within the core of a nuclear reactor.

2. Description of Related Art

In a nuclear reactor for power generation, such as a pressurized water reactor, heat is generated by fission of a nuclear fuel such as enriched uranium, and transferred into a coolant flowing through a reactor core. The core contains elongated nuclear fuel rods mounted in proximity with one another in a fuel assembly structure, through and over which the coolant flows. The fuel rods are spaced from one another in co-extensive parallel arrays. Some of the neutrons and other atomic particles released during nuclear decay of the fuel atoms in a given fuel rod pass through the spaces between fuel rods and impinge on the fissile material in adjacent fuel rods, contributing to the nuclear reaction and to the heat generated by the core.

Moveable control rods are dispersed throughout the nuclear core to enable control of the overall rate of the fission reaction, by absorbing a portion of the neutrons passing between fuel rods, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to fission in adjacent fuel rods; and retracting control rods reduces the extent of neutron absorbing material and increases the rate of the nuclear reaction and the power output of the core.

The control rods are supported in cluster assemblies that are moveable to advance or retract a group of control rods relative to the core. For this purpose, control rod drive mechanisms are provided, typically as part of the upper internals arrangement located, at least in part, within the reactor vessel above the nuclear core. The reactor vessel of a pressurized water reactor is typically pressurized to a high internal pressure, in the order of 2,500 psig and operates at temperatures in the order of 650° F. (343° C.), and the control rod drive mechanisms of conventional pressurized water reactors are housed in pressure housings that are tubular extensions of the reactor pressure vessel. FIG. 1 is a schematic view of a prior art nuclear reactor containment 10 housing a nuclear reactor pressure vessel 12 of a typical pressurized water reactor having a nuclear core 14 supported within the lower half of the pressure vessel 12. A control rod assembly 16, i.e., one of the cluster assemblies, is figuratively shown within the core 14 and supports a cluster of control rods 18 that are moved into and out of the fuel assemblies (not shown) by a drive rod 20. The drive rod 20 is moveably supported by a drive rod housing 24 that extends upwardly and through a removable reactor closure head 22. Control rod drive mechanisms (CRDM) are positioned above the reactor head around the control rod drive housing 24 and move the drive rods in a vertical direction to either insert or withdraw the control rods 18 from the fuel assemblies within the core 14. Rod position indicator coils 26 or other indicator mechanisms, e.g., reed switches, are positioned around the housing 24 to track the position of the drive rod 20, and thus the control rods 18, relative to the core 14. The output of the position indicator sensors 26 is fed through a processor rod position indicator (RPI) electronics cabinet 28 within the containment 10. The output of the rod positioning indicator electronics cabinet 28 is then fed outside the containment to a larger cabinet 30 and an RPI processing unit 32. The logic cabinet 30 interfaces with the control system 34 which provides manual instructions from a user interface 36 as well as automatic instructions which are generated from intelligence obtained from plant sensors not shown. The logic cabinet 30 receives the manual demand signals from an operator through the user interface 36 and a reactor control system 34 or automatic demand signals from the reactor control system 34 and provides the command signals needed to operate the control rods 18 according to a predetermined schedule. The power cabinet 38 provides a programmed current to operate the CRDM, all in a well known manner.

One type of mechanism for positioning a control rod assembly 16 is a magnetic jack type mechanism, operable to move the control rod drive rod by an incremental distance, of approximately ⅝ inch (1.63 cm), into or out of the core in discrete steps. In one embodiment, the control rod drive mechanism has three electromagnetic coils and armatures or plungers activated by the electromagnetic coils, that are operated in a coordinated manner to raise and lower the drive rod shaft 20 and a control rod cluster assembly 16 coupled to the shaft 20. The three coils (CRDM) are mounted around and conventionally outside the pressure housing 24, isolated from the coolant within the pressure vessel 12. Two of the three coils operate grippers that when powered by the coils engage the drive rod shaft, with one of the grippers being axially stationary and the other axially moveable under the influence of the third coil.

The drive rod shaft has axially spaced circumferential grooves that are clasped by latches on the grippers, spaced circumferentially around the drive shaft. The third coil actuates a lift plunger coupled between the moveable grippers and a fixed point. If the power to the control rod mechanism is lost, the two grippers both release and the control rods drop by gravity into their maximum nuclear flux damping position. So long as control rod power remains activated, at least one of the stationary grippers and the moveable grippers holds the drive rod shaft at all times.

The three coils are operated in a timed and coordinated manner alternately to hold and to move the drive shaft. The sequence of gripping actions and movement is different depending on whether the step wise movement is a retraction or an advance. The stationary grippers and the moveable grippers operate substantially alternately, although during the sequence of movements both types of grippers engage the drive shaft during a change from holding stationary to movement for an advance or retraction. The stationary gripper can hold the drive shaft while the moveable gripper is moved to a new position of engagement for lowering (advancing) the drive shaft and the control rods. The moveable grippers engage the drive shaft when moving it up or down as controlled by the lift plunger. After the moveable gripper engages the drive shaft, the stationary gripper is released and then the plunger is activated or de-activated to affect movement in one direction or the other. Typically, each jacking or stepping movement moves the drive rod shaft ⅝ inch (1.6 cm), and some 228 steps are taken at about 0.8 seconds per step to move a control rod cluster over its full span of positions between the bottom and the top of a typical fuel assembly, though the number of steps will vary with the height of the fuel assembly.

A number of particular coil arrangements and gripper designs are possible. Examples of coil jacking mechanisms with a stationary gripper, a moveable gripper and a lifting coil, as described heretofore are described, for example, in U.S. Pat. Nos. 5,307,384, 5,066,451 and 5,009,834. In addition, four and five-coil linear drive mechanisms have been employed that operate in a similar manner, such as that described in U.S. Pat. No. 3,959,071.

Whatever mechanical arrangement is employed for the grippers and lifting coils/armatures, both the magnetic jack mechanism coils and the position indicating sensors have been conventionally located outside the pressure boundary of the reactor vessel where they can be cooled, usually by forced ventilation, and are magnetically coupled to the latch assemblies, in the case of the drive mechanism, and the magnetized portion of the control rod drive rod, in the case of the position indication system, through the pressure housings that surround the drive rods. However, at least one of the next generation nuclear reactors under development is a small modular reactor that has the core, upper internals, steam generator, pressurizer and inlets and outlets of the primary loop circulation pumps housed within the same pressure vessel. In such an arrangement, the entire control rod drive mechanism is immersed within the reactor coolant, in which the conventional arrangement of coils and position sensors could not operate reliably. Even if the conventional coils and position sensors were housed to protect them from direct contact with the coolant, conventional coils and position sensors could not withstand the temperatures they would experience in an operating cycle.

FIGS. 2 and 3 illustrate such a small modular reactor. FIG. 2 shows a perspective view, partially cut away, to show the pressure vessel and its internals. FIG. 3 is an enlarged view of the pressure vessel shown in FIG. 2. The pressurizer 54 is integrated into the upper portion of the reactor vessel head and eliminates the need for a separate component. A hot leg riser 56 directs primary coolant from the core 14 to a steam generator 58 which surrounds the hot leg riser 56. Six reactor coolant pumps 60 are circumferentially spaced around the reactor vessel at an elevation near the upper end of the upper internals 62. The reactor coolant pumps are horizontally mounted axial flow canned motor pumps. The reactor core 14 and the upper internals 62, except for their size, are substantially the same as the corresponding components in an AP 1000® reactor. From the foregoing, it should be apparent that a traditional control rod position indication system would not function reliably in the reactor design illustrated in FIGS. 2 and 3, because the sensors would be fully immersed in the coolant. Even if conventional components were shielded from the coolant with an outer housing, they would not readily receive sufficient cooling to prevent degradation of the sensors.

Accordingly, a new position indication system is desired that will function reliably while immersed in a reactor coolant.

Furthermore, such a design is desired that will satisfy regulatory requirements with minimal testing.

SUMMARY

These and other objects are achieved by a nuclear reactor power generating system having a reactor vessel including a core of fissile material enclosed within the reactor vessel with the reactor vessel configured to have a coolant passing therethrough, traversing the core. At least one control rod is reciprocally moveable into and out of the core with the control rod having a magnetized upper portion and a drive mechanism that moves the magnetized upper portion over a travel length as the control rod moves over a full extent of its travel. The drive mechanism is substantially, fully immersed in the coolant except for energizing feeds which power the drive mechanism. The nuclear reactor further includes a control rod position indicator supported along at least a portion of the travel length and surrounded by the coolant. The control rod position indicator includes a plurality of magnetic switch modules that respectively close a magnetic circuit when the magnetized upper portion of the control rod passes by. The magnetic switch modules are supported at discrete spaced locations along the travel length in a hermetically sealed non-magnetic tube which shields the magnetic switches from the surrounding coolant. Preferably, the hermetically sealed non-magnetic tube is constructed substantially from metallic and/or ceramic materials with the metallic materials preferably selected from non-magnetic grades of stainless steel.

In one embodiment, at least some of the magnetic switch modules comprise a series arrangement of two magnetic switches, e.g., reed switches. In one arrangement, each of the magnetic switch modules has a module input and a module output with the module inputs connected together with a series resistive load in between each of the module inputs and a first position indicator output terminal and the module outputs connected in parallel at a second position indicator output terminal, so that the series arrangement of resistive loads forms a voltage divider network. Preferably, the magnetic switch modules are supported on a non-magnetic terminal strip such as one made out of a ceramic material.

In another arrangement, the space between discrete locations of the magnetic switch modules is approximately 1½ inch (3.8 cm). Preferably, an extra magnetic switch module is provided below a lowermost of the magnetic switch modules that is positioned at 1¼ inch (3.2 cm) from a bottom of the travel length. Desirably, the extra magnetic switch module is connected in parallel to the other magnetic switch modules.

In a broad sense, the control rod position indication system of this invention includes a plurality of active components mounted on or proximate a portion of the control rod drive assembly that drives the control rods into and out of the core, and energizing leads which extend from the active components through and out of the pressure vessel for activating the active components, wherein the active components are entirely contained within the pressure vessel. Desirably, the sensors are encased in a high temperature potting compound hermetically sealed within the ceramic and/or stainless steel housing with the active components constructed almost entirely of metallic, ceramic and glass materials.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
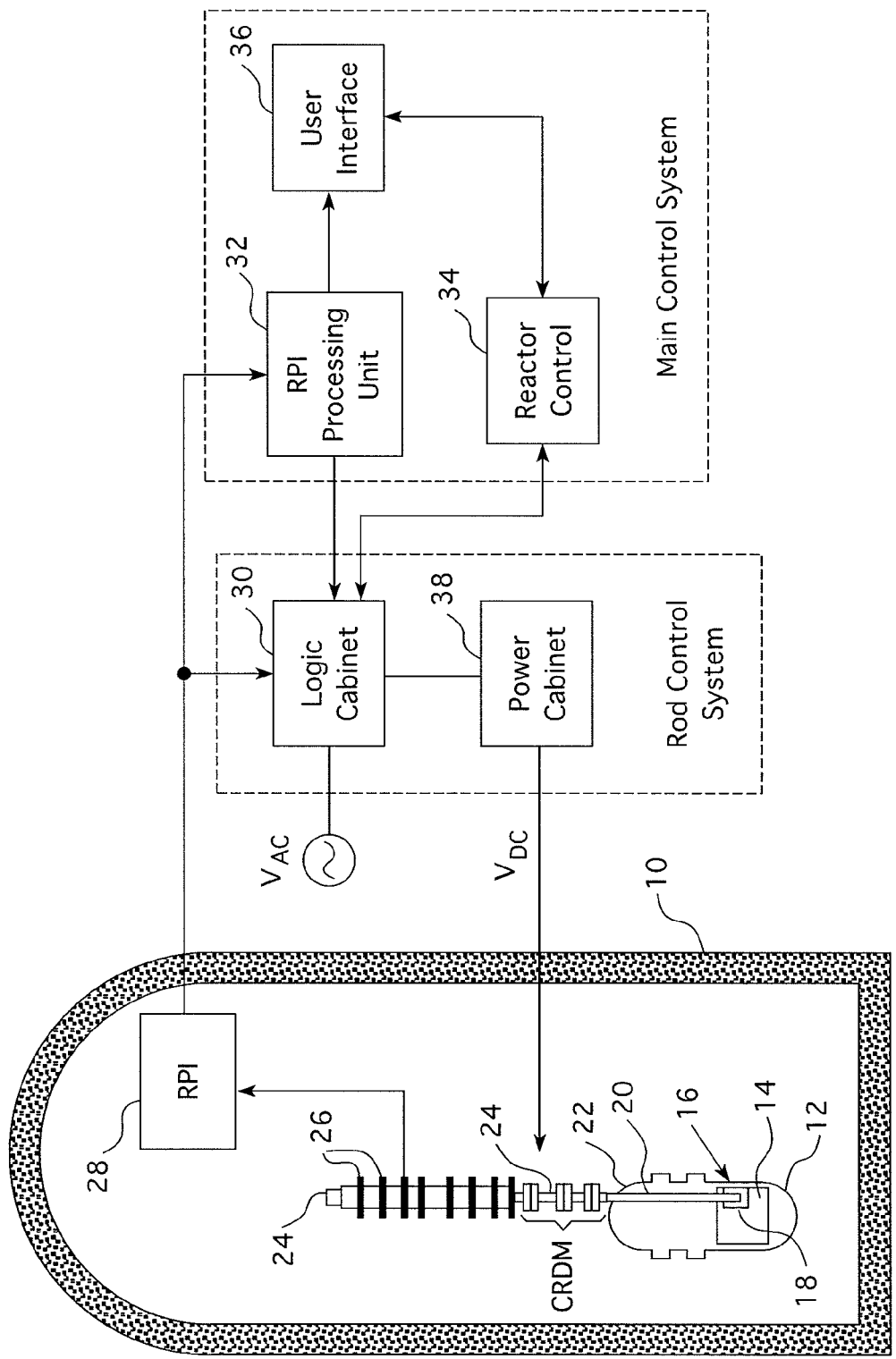
FIG. 1 is a schematic view of a traditional pressurized water reactor nuclear containment showing an outline of a nuclear reactor vessel supporting a control rod drive system for inserting and withdrawing a control rod assembly into and out of the core of the reactor vessel.
Figure 3:
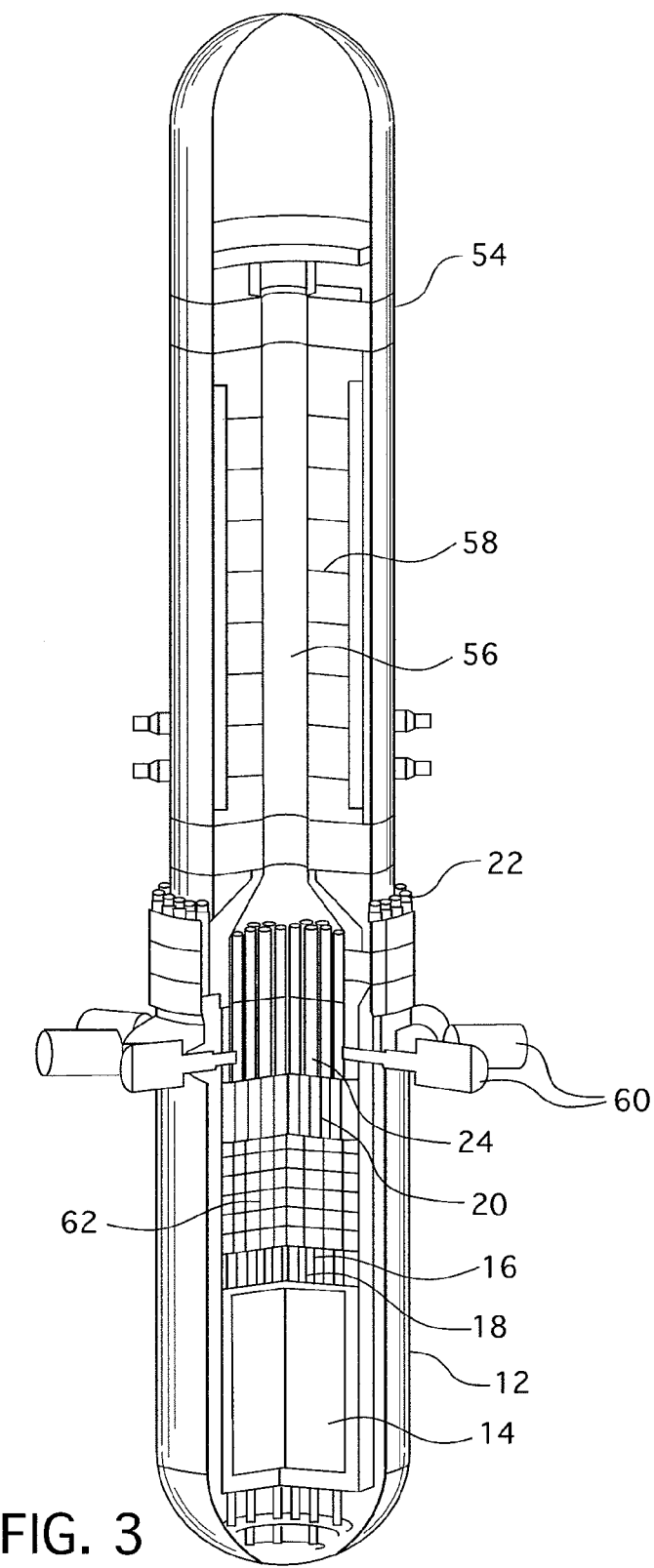
FIG. 3 is an enlarged view of the reactor shown in FIG. 2.
Figure 4:
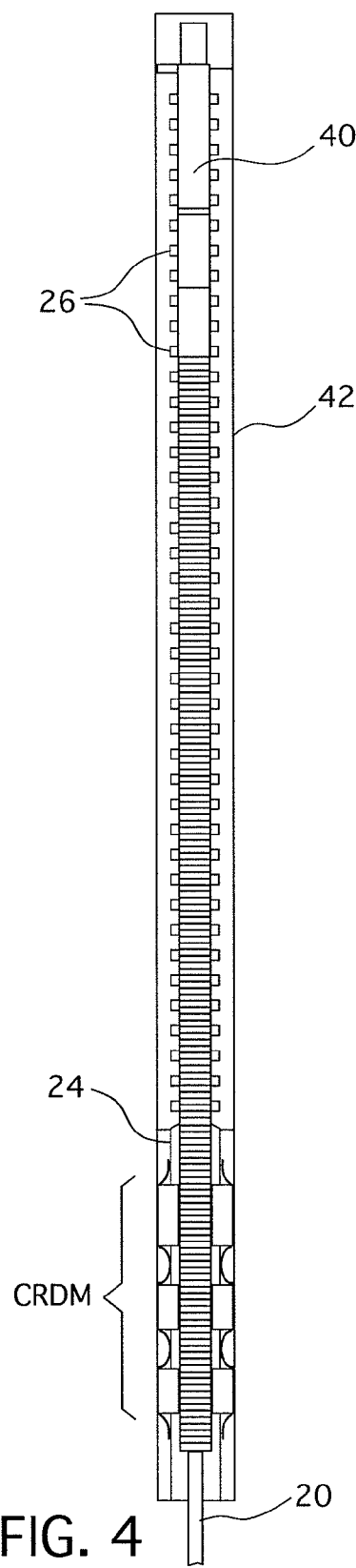
FIG. 4 is a sectional view of a control rod drive mechanism and position indicator upper housing.

As stated in regard to FIG. 1, the control rods are attached in clusters 16 commonly referred to as spider assemblies, with each cluster being commonly driven by a drive rod 20 disposed in a vertical support housing 24 above the reactor core 14 containing the fuel assemblies into which the control rods 18 are advanced or from which the control rods are retracted for variably damping of nuclear flux within the reactor core. The moving parts of the control rod drive mechanism are within the pressure envelope of the reactor and in the conventional designs, the electromagnetic coils (CRDM) for driving the moving parts are disposed around and about each of the housings 24 that extends above the reactor. The rod position indication system sensors 26 are discretely spaced along the housing 24 above the control rod drive mechanism coils as shown in FIG. 4. In this embodiment, the rod position indicator sensor modules 26 are hermetically sealed within an outer housing 42 which protects the sensor modules 26 from direct contact with the surrounding coolant in an application to a small modular reactor such as the one illustrated in FIGS. 2 and 3 or a larger reactor of a similar configuration. The control rod drive rod 20 has a magnetized upper section 40 which substantially travels the full length span of the control rod position indicator sensor modules 26.

The embodiments described herein make use of sensor modules mounted entirely within metallic and/or ceramic materials which can withstand the temperatures, pressures and the radiation environment experienced within a pressurized water nuclear reactor and provide a reliable linear relationship between the position of a magnetized portion 40 of the drive rod 20 and electrical resistance. The sensor modules also provide an absolute position and movement direction indication. The indicator is completely sealed within a non-magnetic stainless steel tube 42 whose interior is sealed from the water pressure within the reactor pressure vessel 12. Though, it should be appreciated, that a ceramic tube or a housing made of other materials that are non-magnetic and can withstand the interior environment within the reactor vessel can also be employed.

The preferred embodiment employs a reed switch position transmitter comprising reed switches configured in a voltage divider network mounted on a non-metallic terminal strip which is sealed within the stainless steel housing 42, which is in turn mounted to a control element drive mechanism CRDM to provide an output voltage signal that is proportional to the position of a control rod drive rod 20 as it is moved by the drive mechanism CRDM. In this embodiment, the sensor modules 26 comprise two reed switches 44, connected in series and located at 1½ inch (3.8 cm) intervals along the terminal strip from 0 to 142½ inches (362 cm). These 97 sets of reed switch modules 26, which includes extra zero switches, make up the analog position indication circuitry of the reed switch position transmitter. An additional set of switches is located at 1¼ inch (3.18 cm) below zero to provide a redundant zero indication. This set of switches, connected in series, is then connected in parallel with the two zero position switches.

In addition to the analog circuitry reed switches 26, there are other reed switches located along the terminal strip. These switches are located at 0 inches, 1¼ inches (3.18 cm), 139⅛ inches (353.38 cm) and 140⅝ inches (357.19 cm).

The two switches at the zero inch level are wired to the reed switch position transmitter terminal block located in the connector adapter box 28 within the containment. These are called the rod drop switches. The two or more switches at the 1¼ inch (3.18 cm) position are connected in parallel for use as lower limit switches. Two wires connect this set of switches to the terminal block in the connector adapter box. The set of switch at the 139⅛ inch (353.38 cm) level are the upper limit switches that are connected in parallel and wired to the reed switch position transmitter connector with two wires. Above these switches at the 140⅝ inch (357.19 cm) level is located another set of limit switches which are connected in parallel and then wired in parallel with the lower set of upper limit switches. These switches ensure an upper limit signal over the full travel of the mechanism's extension rack.

As a magnet on top of the drive rod 20 travels from the zero position to the top position of 142½ inches (361.95 cm), the output resistance measured at the reed switch position transmitter connector, changes in 11 ohm increments. There should be no interruption of output continuity from zero up to and including the top position.

Figure 2:
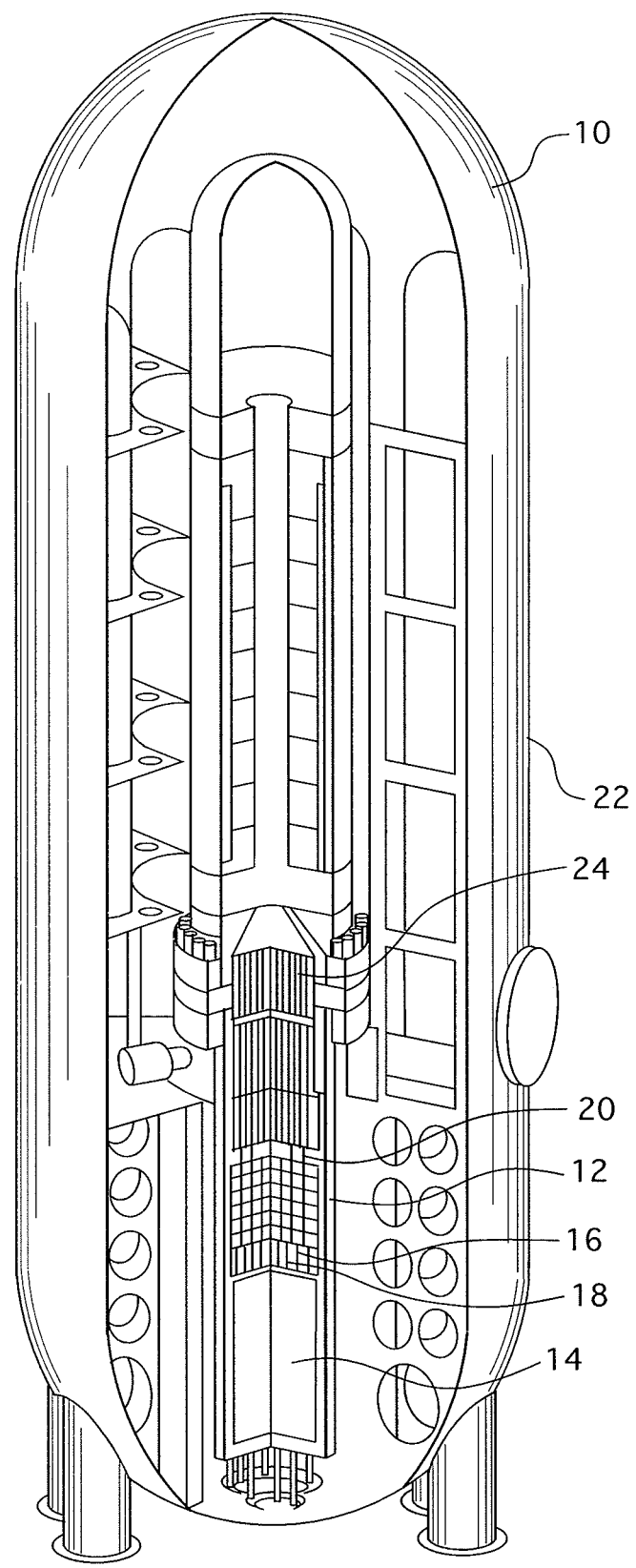
FIG. 2 is a perspective view, partially cut away, showing a small modular reactor system which can benefit from this invention.

The purpose of the rod position indication system is to present a continuous display of the position of each drive rod 20 and generate alarms for mal-positioning of the drive rods This is done conventionally with the use of a detector assembly of sensor modules 26 mounted on the rod drive mechanism pressure vessel 24 as shown in FIG. 1. In accordance with this invention, the detector assembly is mounted on the drive rod travel housing 24 as shown in FIG. 4 as applied to an integral reactor design such as illustrated in FIGS. 2 and 3. In this type of arrangement, the drive rod travel housing 24 is not a pressure vessel, but the outside of the drive rod travel housing 24 as well as the detector sensor modules 26 are sealably enclosed within an outer housing 42 to isolate the sensor modules 26 from the coolant surrounding the outer housing 42. As with conventional designs, each rod position within a bank is monitored and compared to all other rod positions within the same bank. If the difference between a highest rod position and the lowest rod position in a bank exceeds a programmable threshold, the same for all banks, a large deviation alarm will be given both at a display panel and at a control room annunciation system. The total linear measuring range is approximately 143.75 inches (365.13 cm) for a 14 foot fuel assembly.

Figure 5:
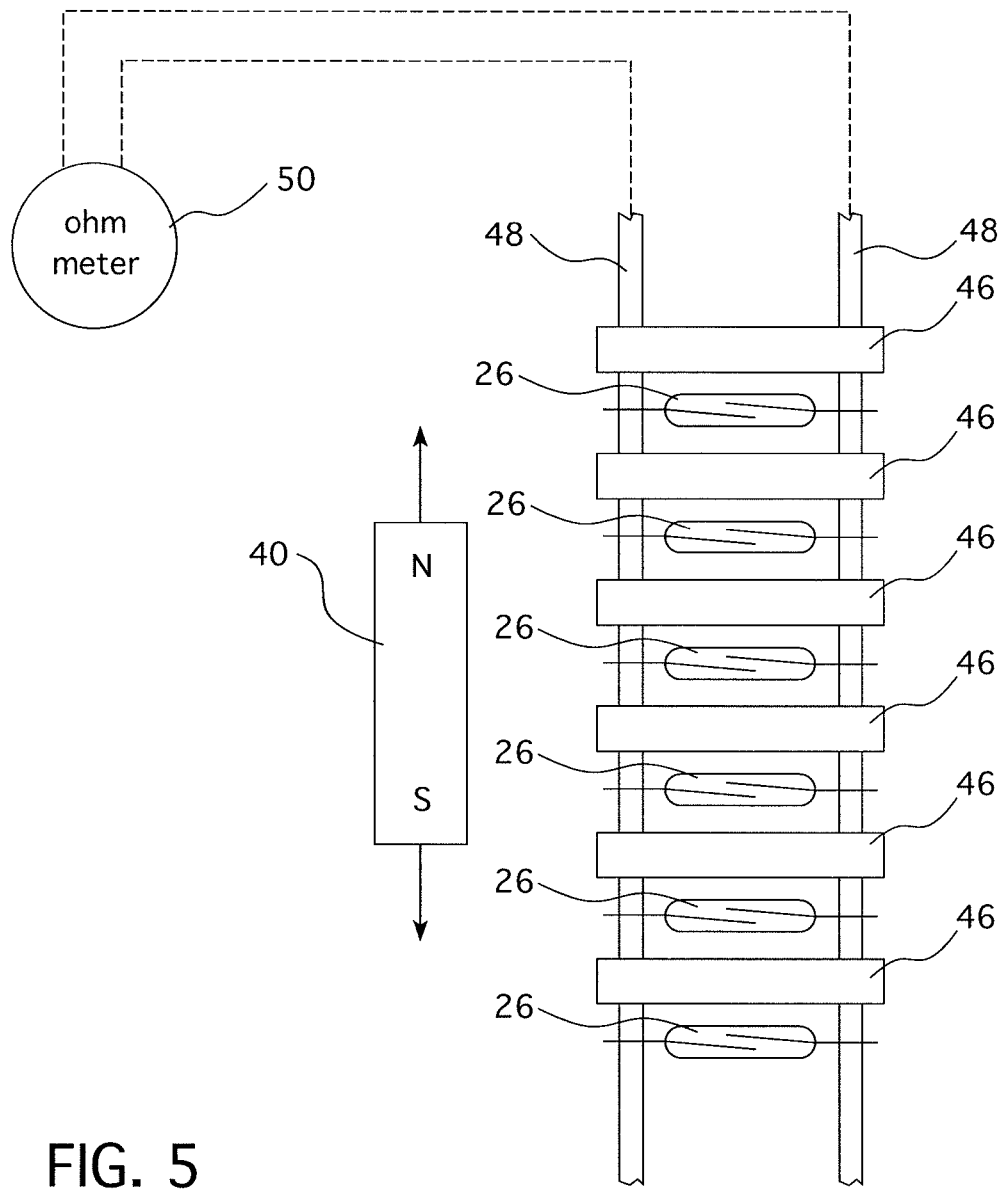
FIG. 5 is schematic view of a reed switch position indicator which can be employed with this invention.
Figure 6:
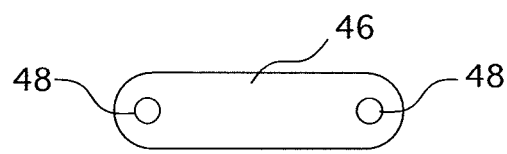
FIG. 6 is a sectional view of FIG. 5 taken along the lines A-A thereof.
Figure 7:
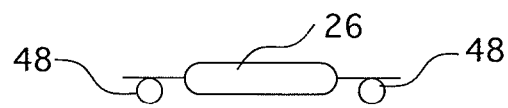
FIG. 7 is a sectional view of FIG. 5 taken along the lines B-B thereof.

FIG. 5 is a schematic which generally shows how the bulk of the sensor modules 26 are connected. Each of the sensor modules is connected in parallel to an adjacent module through a resistor between each of the connections. For example, the modules 26 are shown connected in parallel to two nickel chromium resistance rods 48 that are isolated by ceramic insulator separators 46 with the output of the nickel chromium resistance rods 48 connected to an ohm meter 50 which displays the rod's position. The assembly is potted with a high temperature compound for stability. FIG. 6 is a sectional view taken along the lines A-A of FIG. 5 showing the lower portion of one of the insulators 46 and its connection to the nickel chromium resistance rods 48. FIG. 7 is a cross sectional view taken along the lines B-B of FIG. 5 showing the underside of one of the sensor modules 26 tack welded on either side to the nickel chromium resistance rods 48.

Figure 8:
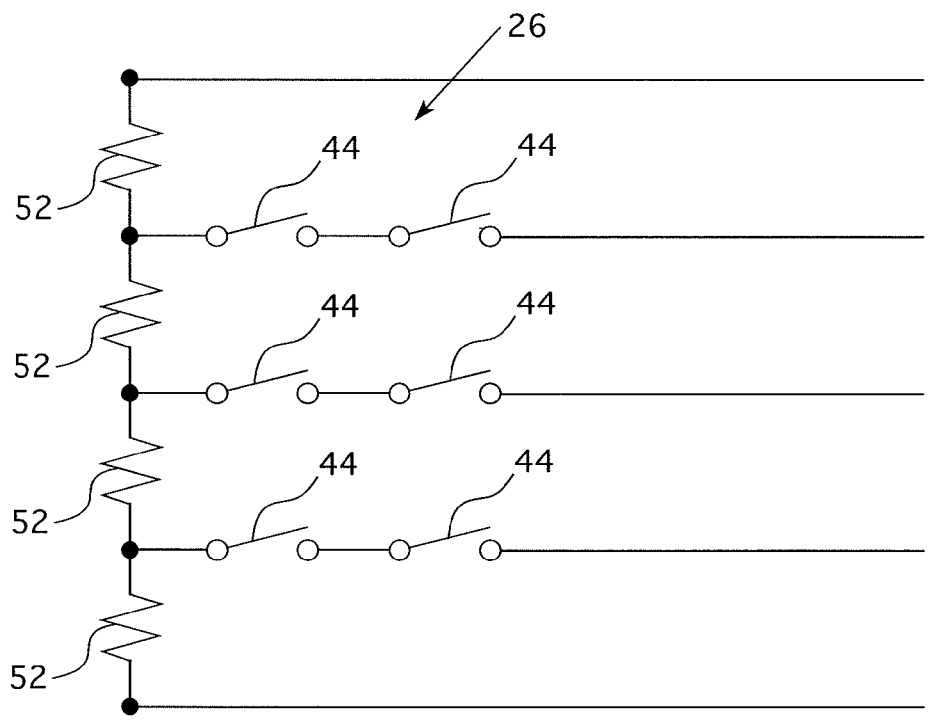
FIG. 8 is a circuitry diagram of the voltage divided network employed by one embodiment of this invention.
Figure 9:
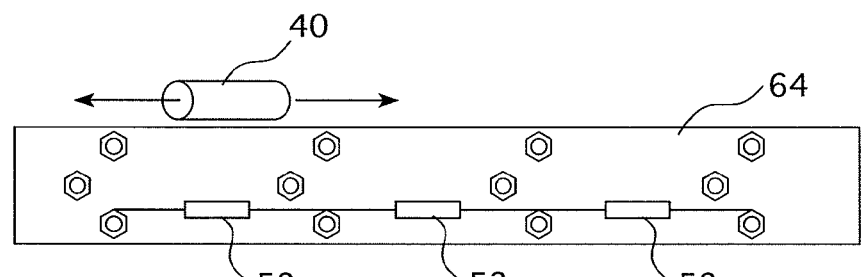
FIG. 9 is a bottom view of a ceramic terminal strip employed by the circuit illustrated in FIG. 8.
Figure 10:
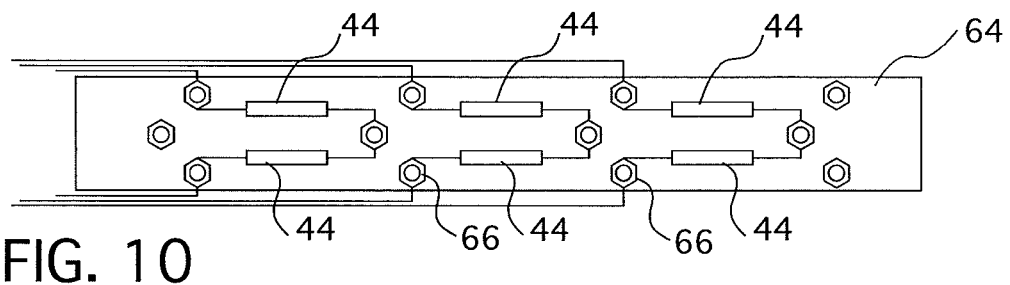
FIG. 10 is a top view of the terminal strip shown in FIG. 9, which implements the circuit arrangement illustrated in FIG. 8.

FIG. 8 is a circuitry diagram similar to the arrangement illustrated in FIG. 5. Each of the sensor modules 26 is made up of a series arrangement of two reed switches 44 and the series arrangement of each of the switches 44, forming a sensor module 26, is connected in between the series arrangement of resistors 52 which in FIG. 5 are the nickel chromium resistance rods 48. FIGS. 9 and 10 show an actual physical embodiment of the circuit illustrated in FIG. 8 laid out on a ceramic terminal strip 64. FIG. 9 shows a bottom view of the terminal strip on which the resistors 52 are mounted and FIG. 10 shows a top view of the same terminal strip on which the reed switches 44 are connected through the terminals 66 to the resistors 52 on the underside of the terminal strip 64.

Thus, a high temperature reed switch position indicator is provided, which is especially suited for applications in which the sensor assembly is immersed within the reactor coolant where it has to withstand the internal temperature, pressure and radiation levels experienced within the interior of a pressurized water reactor pressure vessel. All of the components are either metallic, ceramic or glass materials for this purpose. The position indication system provided for herein thus provides a reliable linear output voltage or resistance change in relation to the magnet position, with the linear output achieved throughout the operating range preferably with the use of ceramic resistors. The result provides an absolute position and movement direction indication and protection for the reed switch position indicator components. Protection is achieved by the selection of materials for the components and by installing the components in a sealed, non-magnetic, hermetically sealed stainless steel or ceramic housing which isolates the rod position indicator from reactor coolant. Electrical leads can then convey the output through a small diameter, such as ¼ inch (0.64 cm) tubing which can be brought out of the reactor through a spool piece which extends through the connection between the reactor vessel and the head. Preferably, electrical connections are silver soldered, brazed or crimped for reliable operation at prolonged temperatures. The drive rod is used as the magnetic source for the reed switch position indicator. Weakening of the magnet's strength due to temperature is mitigated by re-magnetizing the drive rod with the CRDM coils during lifting.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor comprising:
   a pressure vessel;
   a core of fissile material enclosed within the pressure vessel, the pressure vessel configured to have a coolant pass there through, traversing the core;
   at least one control rod moveable into and out of the core, the control rod having a magnetized upper portion and a drive mechanism that moves the magnetized upper portion over a travel length as the control rod moves over a full extent of its travel, the drive mechanism being surrounded by the coolant, except for energizing feeds which power the drive mechanism; and
   a control rod position indicator supported along at least a portion of the travel length and surrounded by the coolant, the control rod position indicator comprising:
      a plurality of magnetic switch modules that respectively close a magnetic circuit when the magnetized upper portion of the control rod passes by, the magnetic switch modules being supported at discrete spaced locations along the travel length; and
      a hermetically sealed nonmagnetic tube enclosing the magnetic switches and shielding the magnetic switches from the surrounding coolant.

2. The nuclear reactor of claim 1 wherein the hermetically sealed nonmagnetic tube is constructed substantially from metallic and/or ceramic materials.

3. The nuclear reactor of claim 2 wherein the metal is stainless steel.

4. The nuclear reactor of claim 1 wherein at least some of the magnetic switch modules comprise a series arrangement of two magnetic switches.

5. The nuclear reactor of claim 4 wherein the magnetic switches are reed switches.

6. The nuclear reactor of claim 1 wherein each of the magnetic switch modules has a module input and a module output with the module inputs connected together with a series resistive load in between each of the module inputs and a first position indicator output terminal and with the module outputs connected in parallel at a second position indicator output terminal, so that the series arrangement of resistive loads forms a voltage divider network.

7. The nuclear reactor of claim 1 wherein the magnetic switch modules are supported on a nonmagnetic terminal strip.

8. The nuclear reactor of claim 7 wherein the nonmagnetic terminal strip is substantially constructed from a ceramic material.

9. The nuclear reactor of claim 1 wherein the space between discrete locations of the magnetic switch modules is approximately 1½ in (3.8 cm).

10. The nuclear reactor of claim 9 including an extra magnetic switch module below a lowermost of the magnetic switch modules that is positioned at 1¼ in. (3.2 cm) from a bottom of the travel length.

11. The nuclear reactor of claim 10 wherein the extra magnetic switch module is connected in parallel to the other magnetic switch modules.

12. The nuclear reactor power generating system of claim 5 wherein the reed switches are encased in a high temperature potting compound.

13. The nuclear reactor power generating system of claim 5 wherein some of the reed switches are connected in series and some of the reed switches are connected in parallel.

14. The nuclear reactor power generating system of claim 5 wherein the reed switches are constructed from metallic, ceramic and glass materials.

* * * * *